(12) United States Patent
Kajiwara

(10) Patent No.: US 9,177,694 B2
(45) Date of Patent: Nov. 3, 2015

(54) WIRE HARNESS

(75) Inventor: Yasuhiro Kajiwara, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 14/237,238

(22) PCT Filed: Apr. 16, 2012

(86) PCT No.: PCT/JP2012/060257
§ 371 (c)(1),
(2), (4) Date: Feb. 5, 2014

(87) PCT Pub. No.: WO2013/057973
PCT Pub. Date: Apr. 25, 2013

(65) Prior Publication Data
US 2014/0166358 A1 Jun. 19, 2014

(30) Foreign Application Priority Data

Oct. 19, 2011 (JP) ................................. 2011-229780

(51) Int. Cl.
| | | |
|---|---|---|
| *H01B 7/00* | (2006.01) | |
| *H02G 3/04* | (2006.01) | |
| *B60R 16/02* | (2006.01) | |
| *B29C 43/18* | (2006.01) | |
| *B29C 43/02* | (2006.01) | |

(52) U.S. Cl.
CPC .............. *H01B 7/0045* (2013.01); *B29C 43/18* (2013.01); *B60R 16/0215* (2013.01); *H02G 3/0406* (2013.01); *B29C 43/021* (2013.01)

(58) Field of Classification Search
CPC .. H02G 3/0481; H02G 3/0406; B29C 43/305; H01B 13/01263
USPC ...................................................... 174/68.1, 72
See application file for complete search history.

(56) References Cited

U.S. PATENT DOCUMENTS

| | | | |
|---|---|---|---|
| 4,511,611 A * | 4/1985 | Moisson ....................... 428/34.2 |
| 2011/0100671 A1* | 5/2011 | Seraj et al. ................... 174/68.1 |
| 2013/0056240 A1 | 3/2013 | Kawai | |

FOREIGN PATENT DOCUMENTS

| | | |
|---|---|---|
| JP | 2003-197038 | 7/2003 |
| JP | 2011-160611 | 8/2011 |
| JP | 2011-171098 | 9/2011 |
| WO | 2011/096103 | 8/2011 |
| WO | 2011/102013 | 8/2011 |
| WO | 2011/158393 | 12/2011 |

* cited by examiner

*Primary Examiner* — Tuan T Dinh
*Assistant Examiner* — Rockshana Chowdhury
(74) *Attorney, Agent, or Firm* — Greenblum & Bernstein, P.L.C.

(57) ABSTRACT

A wire harness includes a wire harness main body having at least one electric wire and a protective member formed by formed by hot pressing a non-woven member in a state where the non-woven member covers at least a portion of the wire harness main body. The protective member includes a first compressed portion extending along a longitudinal direction of the wire harness main body and being hot pressed to a first degree of compression, and a second compressed portion extending along the longitudinal direction of the wire harness main body, projecting further than the first compressed portion, and being hot pressed to a second degree of compression lower than the first degree of compression.

2 Claims, 4 Drawing Sheets

WIRE HARNESS

FIELD OF THE INVENTION

The present invention relates to a technology protecting a wire harness.

BACKGROUND OF THE INVENTION

Conventionally, a technology has been proposed in which a bundle of electric wires is hot pressed while covered by a non-woven fabric to form an electric wire protective member, as in Patent Literature 1.

RELATED ART

Patent Literature

Patent Literature 1: Japanese Patent Laid-open Publication No. 2011-160611

SUMMARY OF THE INVENTION

Problems to be Solved by the Invention

When a path of the bundle of electric wires is regulated using an electric wire protective member such as that noted above, a compression rate during hot pressing of the non-woven fabric is set to be high.

However, when the compression rate during hot pressing of the non-woven fabric is increased, a surface of the protective member may become hard. Accordingly, a noise may be more likely to be generated due to contact between the protective member and a nearby member. In order to inhibit such noise, a pliant member of urethane and the like could be wrapped around an outer periphery of the protective member, or the like. However, this would incur excessive component costs and processing costs.

Therefore, the present invention seeks to enable path regulation and noise counteraction for a wire harness with as simple a configuration as possible.

Means for Solving the Problems

In order to resolve the above issues, a wire harness according to a first aspect includes a wire harness main body that includes at least one electric wire; and a protective member formed by hot pressing a non-woven member in a state where the non-woven member covers at least a portion of the wire harness main body, the protective member having a first compressed portion extending along a longitudinal direction of the wire harness main body and being hot pressed to a first degree of compression, and a second compressed portion extending along the longitudinal direction of the wire harness main body, projecting further than the first compressed portion, and being hot pressed to a second degree of compression lower than the first degree of compression. In addition, a plurality of the second compressed portions are provided so as to project in a shape radiating around the wire harness main body.

A second aspect is the wire harness according to the first aspect, in which the first compressed portion is compressed to the first degree of compression, where a thickness after hot pressing relative to a thickness prior to hot pressing is ½ or less; and in which the second compressed portion is compressed to the second degree of compression, where a thickness after hot pressing relative to a thickness prior to hot pressing is ¾ or less.

A fourth aspect is the wire harness according to the first or second aspect, in which the first compressed portion is recessed further than the second compressed portion so as to be accommodated between the plurality of second compressed portions.

Effect of the Invention

According to the first aspect, path regulation can be performed by the first compressed portion, which is hot pressed to a high degree of compression, and noise counteraction can be performed by the second compressed portion, which is hot pressed to a low degree of compression. Therefore, path regulation and noise counteraction for the wire harness can be performed with as simple a configuration as possible. In addition, the first compressed portion and the second compressed portion are both hot pressed, and thus also have excellent abrasion resistance.

According to the second aspect, the first compressed portion is compressed to the first degree of compression, where the thickness after hot pressing relative to the thickness prior to hot pressing is ½ or less. Therefore, sufficient path regulation can be performed. In addition, the second compressed portion is compressed to the second degree of compression, where the thickness after hot pressing relative to the thickness prior to hot pressing is ¾ or less. Therefore, abrasion resistance can be obtained while performing noise counteraction.

According to the first aspect, the plurality of second compressed portions are provided so as to project in the shape radiating around the wire harness main body. Therefore, more reliable path regulation is possible.

According to the fourth aspect, the first compressed portion is recessed further than the second compressed portion so as to be accommodated between the plurality of second compressed portions. Therefore, a nearby member is unlikely to contact the first compressed portion, thus enabling more effective noise counteraction.

MODE FOR CARRYING OUT THE INVENTION

Figure 1:
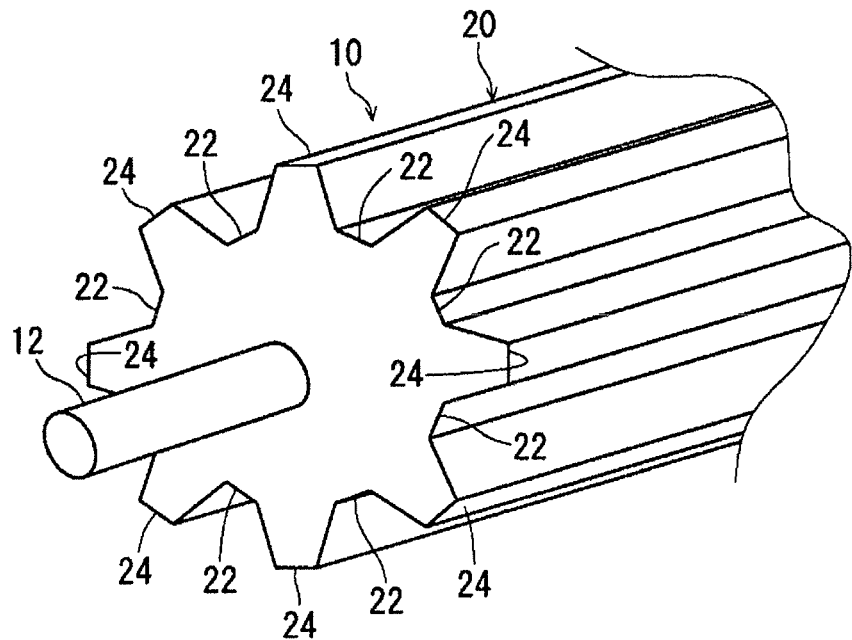
FIG. 1 is a schematic perspective view of a wire harness according to an embodiment.
Figure 2:
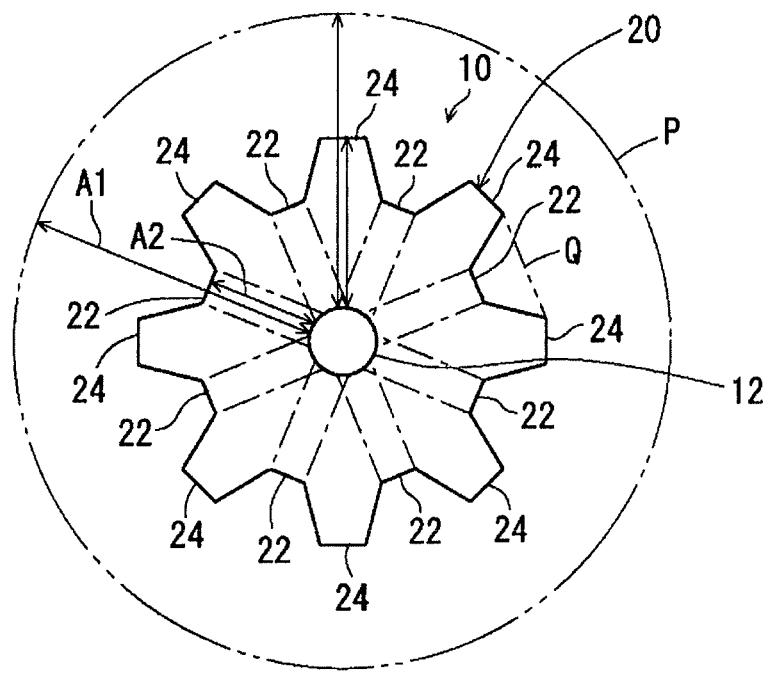
FIG. 2 is a schematic cross-sectional view of the same wire harness.

Hereafter, a wire harness according to an embodiment is described. FIG. 1 is a schematic perspective view of a wire harness 10 according to the embodiment. FIG. 2 is a schematic cross-sectional view illustrating the wire harness 10. In addition, a circle P, shown in a two-dot-dashed line in FIG. 2, illustrates a region occupied by a non-woven member prior to hot pressing.

The wire harness 10 includes a wire harness main body 12 and a protective member 20.

The wire harness main body 12 includes at least one electric wire. Herein, the wire harness main body 12 is configured by bundling a plurality of electric wires. Moreover, the electric wires are a wiring material making a mutual electrical connection between various electric devices in a vehicle body and the like. The wire harness main body 12 may also include an optical cable and the like.

The protective member 20 is formed by hot pressing a non-woven member (non-woven fabric, for example) in a state where the non-woven member covers at least a portion in a longitudinal direction of the wire harness main body 12. The protective member 20 may cover substantially the entire longitudinal direction of the wire harness main body 12, or may cover a portion of the wire harness main body 12.

Anything capable of hardening when undergoing a heating process can be used as the non-woven member. A non-woven member that includes an elementary fiber and an adhesive resin (also referred to as a binder) intertwined therewith can be used as the non-woven member of this type. The adhesive resin is a resin having a melting point lower than that of the elementary fiber (for example, 110° to 115° C.). When the non-woven member is heated at a processing temperature lower than the melting point of the elementary fiber and higher than the melting point of the adhesive resin, the adhesive resin melts and seeps in between the elementary fibers. Thereafter, when the temperature of the non-woven member lowers below the melting point of the adhesive resin, the adhesive resin hardens in a state bonding the elementary fibers together. Thus, the non-woven member becomes harder than in a state before heating and is maintained in a shape molded at the time of heating. In addition, the melted adhesive resin also seeps into and hardens at portions where non-woven members touch each other. Thereby, the touching portions of the non-woven member are joined.

However, the elementary fiber may be any fiber capable of holding a fibrous state at the melting point of the adhesive resin, and various kinds of fibers can be used besides a resin fiber. In addition, a thermoplastic resin fiber having a melting point lower than the melting point of the elementary fiber can be used as the adhesive resin. The adhesive resin may also have a granular shape or a fibrous shape. Alternatively, a binder fiber may be provided by forming an adhesive resin layer on an outer periphery of a core fiber and may be intertwined with the elementary fiber. In such a case, the same material can be used for the core fiber as for the elementary fiber.

An exemplary combination of the elementary fiber and the adhesive resin may include using a PET (polyethylene terephthalate) resin fiber for the elementary fiber and a PET and PEI (polyethylene isophthalate) copolymer resin as the adhesive resin. In such a case, the melting point of the elementary fiber is approximately 250° C. and the melting point of the adhesive resin is 110° C. to 150° C. Therefore, when the non-woven member is heated to a temperature of 110° C. to 250° C., the adhesive resin melts and seeps in between the elementary fibers, which hold a fibrous shape without melting. Then, when the temperature of the non-woven member lowers below the melting point of the adhesive resin, the adhesive resin hardens in a state bonding the elementary fibers together, maintaining the molded form and joining the non-woven members together.

Also, hot pressing refers to a process in which a heating process is conducted on the non-woven member and the non-woven member is pressed against a mold and formed to a predetermined shape. The heating process and the process of forming to the predetermined shape may be performed simultaneously, or may be performed separately and sequentially. For example, after being heated in a compressed state, the non-woven member is pressed against a predetermined mold and bent before hardening due to cooling, and can thus maintain the bent shape. A description is given in greater detail hereafter of an example of the hot press processing appropriate for manufacturing the protective member 20 according to the present embodiment.

The protective member 20 includes a first compressed portion 22 and a second compressed portion 24.

The first compressed portion 22 extends along an extension direction of the wire harness main body 12. Herein, the wire harness main body 12 has a straight-line shape. Therefore, the first compressed portion 22 extends in a straight-line shape. In a case where the wire harness main body 12 is maintained in the bent shape conforming to a layout of a location for an installation thereof, the first compressed portion 22 is formed so as to extend in a state being bent according to the bent shape of the wire harness main body 12. Further, the first compressed portion 22 is hot pressed so as to be compressed to a greater degree than the second compressed portion 24 and so as to be recessed further toward the wire harness main body 12 than the second compressed portion 24.

The second compressed portion 24 also extends along the extension direction of the wire harness main body 12. The second compressed portion 24 is hot pressed so as to be compressed to a lesser degree than the first compressed portion 22 and so as to project further in an outward direction of the wire harness 10 than the first compressed portion 22.

Herein, a plurality (herein, eight) of the second compressed portions 24 are formed around a center axis of the wire harness main body 12. In particular, in the present embodiment, the plurality of second compressed portions 24 are formed so as to project in a shape radiating around the center axis of the wire harness main body 12. The plurality of second compressed portions 24 are formed at uniform intervals around the center axis of the wire harness main body 12, but this is not essential. In addition, a plurality (herein, eight) of the first compressed portions 22 are formed so as to be interposed between the plurality of second compressed portions 24. In other words, the plurality of first compressed portions 22 and the plurality of second compressed portions 24 are formed in an alternating manner around the wire harness main body 12. Portions may also be present that have been compressed to a degree approximately intermediate between the first compressed portions 22 and the second compressed portions 24.

The degree of compression of the first compressed portion 22 and the second compressed portion 24 can be evaluated by, for example, a ratio of a thickness in a diameter direction of the first compressed portion 22 or the second compressed portion 24 after hot pressing relative to a thickness in a diameter direction of the non-woven member prior to hot pressing at a portion corresponding to the first compressed portion 22 or the second compressed portion 24, the ratio of thicknesses being evaluated on a surface substantially orthogonal with respect to the extension direction of the wire harness main body 12.

The first compressed portion 22 chiefly serves to regulate a path of the wire harness main body 12 (which may have a straight-line shape or a bent shape). Given this, the first compressed portion 22 is preferably compressed to a first degree of compression in which a thickness A2 after hot pressing relative to a thickness A1 prior to hot pressing is ½ or less (and more preferably is ⅓ or less; see FIG. 2).

The second compressed portion 24 chiefly serves as a noise countermeasure in a case where the wire harness 10 contacts another nearby member. The second compressed portion 24 projects further than the first compressed portion 22, and thus a certain degree of abrasion resistance is required. Given this, the second compressed portion 24 is preferably compressed less than the degree of compression of the first compressed portion 22, to a second degree of compression in which a thickness B2 after hot pressing relative to a thickness B1 prior to hot pressing is ¾ or less (and more preferably is ⅔ or less; see FIG. 2).

In addition, the first compressed portion 22 is preferably recessed further than the second compressed portion 24, to a degree that the first compressed portion 22 is accommodated between the second compressed portions 24 on both sides thereof. More specifically, the first compressed portion 22 is preferably recessed further inward than a straight line Q (see FIG. 2) linking apexes of the second compressed portions 24 on both sides thereof. Thus, the first compressed portion 22, which has been compressed at a comparatively high degree of compression, is unlikely to contact a nearby outside member.

A description is given of a method for manufacturing the protective member 20 by hot pressing.

Figure 3:
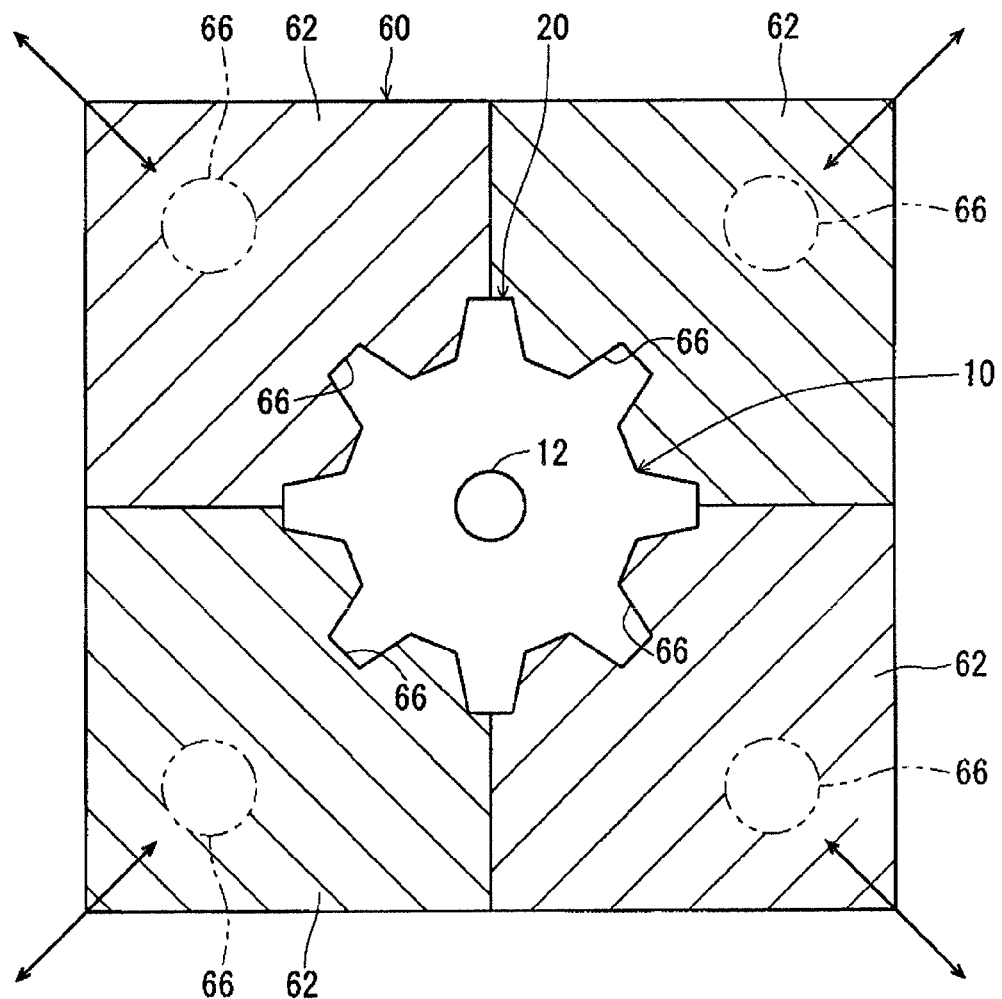
FIG. 3 is an explanatory view illustrating an exemplary manufacturing process of a protective member.

A hot press mold 60 can be used that includes, as shown in FIG. 3, for example, a plurality (herein, four) of divided dies 62. Each divided die 62 is an elongated member formed with metal or the like having excellent thermal conductivity and is configured to be capable of assembly so as to form a square shape in cross-section. A die surface 64 is formed on each divided die 62 on a portion facing a center in an assembled state, the die surface 64 opening toward the center. Each die surface 64 is formed to be substantially identical to a length of a portion to be protected on the wire harness main body 12 (a portion to be covered by the protective member 20). In addition, the die surface 64 is formed in a shape extending according to a path where the portion to be protected on the wire harness main body 12 is routed in the vehicle body. Furthermore, each die surface 64 is formed in a shape having a trench or a ridge according to an outer peripheral shape of the first compressed portions 22 and the second compressed portions 24 of the protective member 20. Also, by combining the plurality of divided dies 62, the plurality of die surfaces 64 form a space enclosed by the die surfaces and corresponding to an outer surface shape of the protective member 20. Moreover, a heating portion 66, such as a heater or the like, is provided to each of the divided dies 62.

A description is given of a method for manufacturing the protective member 20 using the hot press mold 60.

First, the portion to be protected on the wire harness main body 12 is covered with the non-woven member, the wire harness main body 12 including at least one electric wire. As a mode of covering a periphery of the wire harness main body 12 with the non-woven member, a configuration can be employed, for example, in which a sheet-shaped non-woven member (non-woven fabric) is formed into a square shape, then the square-shaped non-woven member is wrapped at least once around the wire harness main body 12. Alternatively, a configuration can be employed in which, for example, a sheet-shaped non-woven member (non-woven fabric) is formed into a strip shape, then the strip-shaped non-woven member is spirally wrapped around the wire harness main body 12.

Next, the non-woven member covering the wire harness main body 12 is placed between the die surfaces 64 of each of the divided dies 62, then the non-woven member is hot pressed within each die surface 64. Specifically, the non-woven member is heated in a state where the non-woven member is pressured between each die surface 64. Thereafter, when the non-woven member is cooled, the surface of the non-woven member hardens in a shape corresponding to the shape of each die surface 64. Specifically, the protective member 20 hardens, in a longitudinal direction, in a shape corresponding to an extension-direction shape of each die surface 64. In addition, the surface of the protective member 20 hardens with a shape corresponding to the trench shape or ridge shape of each die surface 64 and is maintained in the predetermined shape. Furthermore, the non-woven member is bonded at portions that touch, and thus a state where the non-woven member covers the wire harness main body 12 is maintained.

Thereafter, by displacing each divided die 62 in a radiating direction moving away from the center of the wire harness 10, the protective member 20 can be punched out and removed from each divided die 62.

According to the wire harness 10 configured as above, the path of the wire harness 10 can be regulated by the first compressed portion 22, which is hot pressed to a high degree of compression. In addition, the second compressed portion 24 projects further than the first compressed portion 22 and, moreover, is compressed to a lower degree of compression than the first compressed portion 22. Therefore, the second compressed portion 24 is flexible and includes a large amount of air in gaps therein. Therefore, in a state where the wire harness 10 is installed in a vehicle or the like, even when a nearby member contacts the protective member 20 of the wire harness 10, the nearby member chiefly touches the second compressed portion 24 and thus is unlikely to generate a sound. A sound absorption effect can also be anticipated, and noise can be counteracted. Therefore, path regulation and noise counteraction in the wire harness 10 can be performed with as simple a configuration as possible, even without wrapping an additional pliant member of urethane and the like around the outer periphery of the protective member 20. Moreover, the first compressed portion 22 and the second compressed portion 24 are hot pressed and the entire surface of the protective member 20 hardens to a certain degree. There is thus excellent abrasion resistance as well.

In addition, a plurality of the second compressed portions 24 are provided so as to project in a shape radiating around the center axis of the wire harness main body 12. Therefore, the path of the wire harness 10 can be more reliably regulated. In order to sufficiently regulate the path of the wire harness 10, the second compressed portion 24 preferably projects in at least three directions in a shape radiating around the center axis of the wire harness main body 12. A more preferable embodiment has the second compressed portion 24 projecting in a shape radiating in four directions, and a more preferable embodiment has the second compressed portion 24 projecting in a shape radiating in eight directions.

In addition, the first compressed portion 22 is recessed further than the second compressed portion 24 so as to be accommodated between the plurality of second compressed portions 24. Therefore, nearby members are unlikely to contact the first compressed portion 22. More effective noise counteraction is thus enabled.

Furthermore, exemplary shapes of the first compressed portion 22 and the second compressed portion 24 are not limited to the above-described example.

Figure 4:
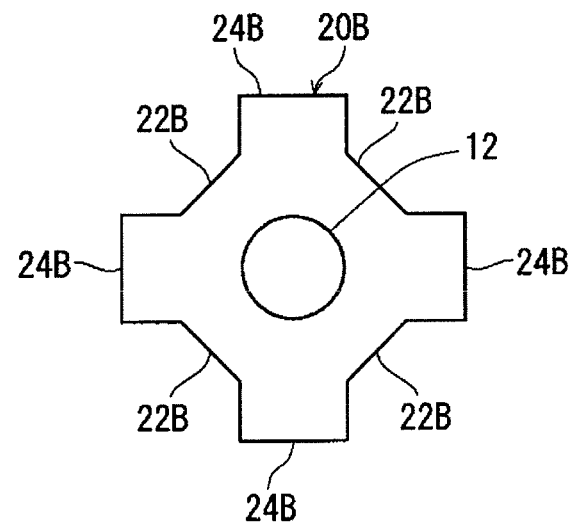
FIG. 4 is a schematic cross-sectional view of a wire harness according to a modified example.
Figure 5:
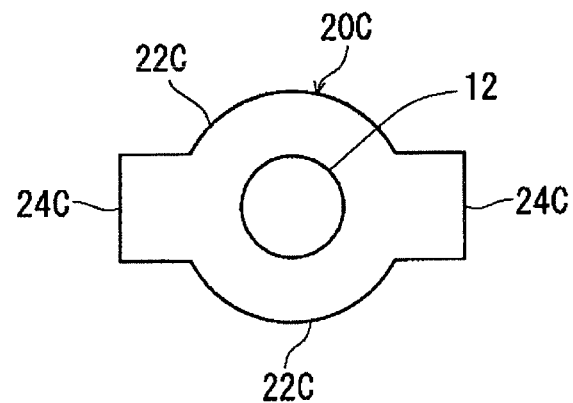
FIG. 5 is a schematic cross-sectional view of a wire harness according to a modified example.

For example, as in a modified example of a protective member 20B shown in FIG. 4, second compressed portions 24B corresponding to the second compressed portions 24 may project in a shape radiating in four directions around the center axis of the wire harness 10 and first compressed portions 22B corresponding to the first compressed portions 22 may be formed therebetween. Alternatively, as in a modified example of a protective member 20C shown in FIG. 5, two second compressed portions 24C corresponding to the second compressed portions 24 may project outward on two sides with the center axis of the wire harness 10 therebetween, while first compressed portions 22C corresponding to the first portions 22 may be formed therebetween.

Figure 6:
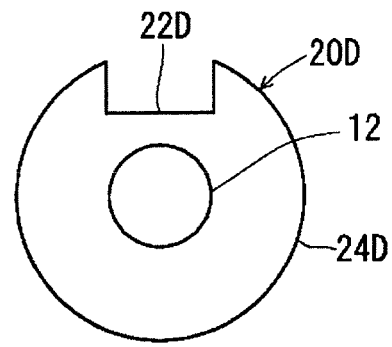
FIG. 6 is a schematic cross-sectional view of a wire harness according to a modified example.

Alternatively, as in a modified example of a protective member 20D shown in FIG. 6, a single first compressed portion 22D corresponding to the first compressed portion 22 may be formed in a recessed trench shape on the periphery of the protective member 20D, while the entire remaining portion of the protective member 20D may be formed into a second compressed portion 24D corresponding to the second compressed portion 24.

Figure 7:
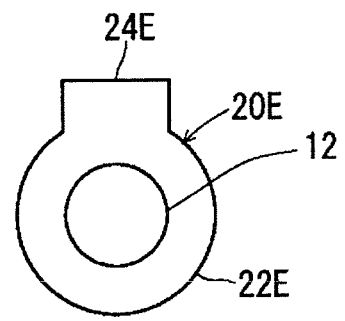
FIG. 7 is a schematic cross-sectional view of a wire harness according to a modified example.

Alternatively, as in a modified example of a protective member 20E shown in FIG. 7, a single second compressed portion 24E corresponding to the second compressed portion 24 may be formed as a ridge on the periphery of the protective member 20E, while the entire remaining portion of the protective member 20E may be formed into a first compressed portion 22E corresponding to the first compressed portion 22.

Figure 8:
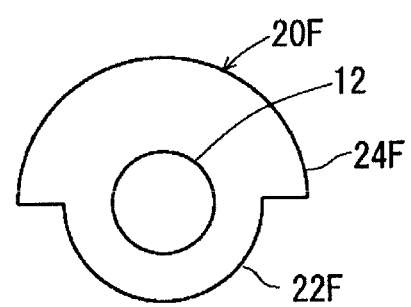
FIG. 8 is a schematic cross-sectional view of a wire harness according to a modified example.

Alternatively, as in a modified example of a protective member 20F shown in FIG. 8, a first compressed portion 22F corresponding to the first compressed portion 22 may be formed on a region halfway around an outer periphery of the protective member 20F, while a second compressed portion 24F corresponding to the second compressed portion 24 may be formed on a region of the remaining half.

The modified examples shown in FIGS. 4 to 8 have an advantage in that they are readily removed from a mold when formed using a hot press mold having a pair of divided dies.

The present invention has been described in detail above; however, the above description is in all respects illustrative and the present invention is not limited to the above description. Numerous modifications not named as examples are understood to be conceivable without deviating from the scope of the present invention.

The invention claimed is:

1. A wire harness, comprising:
a wire harness main body having at least one electric wire; and
a protective member formed by hot pressing a non-woven member covering at least a portion of the wire harness main body, the protective member having a first compressed portion extending along a longitudinal direction of the wire harness main body and being hot pressed to a first degree of compression, and a second compressed portion extending along the longitudinal direction of the wire harness main body, projecting further than the first compressed portion, and being hot pressed to a second degree of compression lower than the first degree of compression,
wherein the first compressed portion is compressed to the first degree of compression, such that a thickness after hot pressing is ½ or less than a thickness prior to hot pressing,
the second compressed portion is compressed to the second degree of compression, such that a thickness after hot pressing is ¾ or less than a thickness prior to hot pressing, and
wherein the second compressed portion is defined by a plurality of projections that project in a shape radiating around the wire harness main body.

2. The wire harness according to claim 1, wherein the first compressed portion is recessed further than the second compressed portion so as to be accommodated between the plurality of projections.

* * * * *